(12) United States Patent
Park et al.

(10) Patent No.: US 10,704,126 B2
(45) Date of Patent: Jul. 7, 2020

(54) NON-NORMALIZED STEEL COMPOSITION AND CONNECTING ROD USING THE SAME, AND METHOD OF MANUFACTURING THE CONNECTING ROD

(71) Applicants: Hyundai Motor Company, Seoul (KR); Kia Motors Corporation, Seoul (KR)

(72) Inventors: Jae-Bong Park, Ulsan (KR); Chang-Ku Lee, Kyounggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 588 days.

(21) Appl. No.: 14/556,172

(22) Filed: Nov. 30, 2014

(65) Prior Publication Data
US 2015/0232972 A1    Aug. 20, 2015

(30) Foreign Application Priority Data

Feb. 17, 2014 (KR) .................... 10-2014-0017862

(51) Int. Cl.
*C22C 38/60* (2006.01)
*F16C 7/02* (2006.01)
(Continued)

(52) U.S. Cl.
CPC ............. *C22C 38/60* (2013.01); *C21D 1/63* (2013.01); *C21D 7/13* (2013.01); *C21D 9/0068* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/50* (2013.01); *F16C 7/00* (2013.01); *F16C 7/023* (2013.01); *C21D 1/30* (2013.01); *C21D 1/607* (2013.01); *C21D 7/06* (2013.01); *C21D 7/10* (2013.01);
(Continued)

(58) Field of Classification Search
CPC ......... C22C 38/02; C22C 38/42; C22C 38/60; C21D 7/13
USPC ............................................ 148/625
See application file for complete search history.

(56) References Cited

FOREIGN PATENT DOCUMENTS

| JP | 08-176733 A | 7/1996 |
|----|-------------|--------|
| JP | 2013-032565 A | 2/2013 |

(Continued)

*Primary Examiner* — Weiping Zhu
(74) *Attorney, Agent, or Firm* — Mintz Levin Cohn Ferris Glovsky and Popeo, P.C.; Peter F. Corless (57) ABSTRACT

Disclosed are a non-normalized steel composition which includes carbon (C), silicon (Si), manganese (Mn), sulfur (S), vanadium (V), titanium (Ti), nitrogen (N), and iron (Fe), and a method of manufacturing the connecting rod for improving yield strength, fatigue strength, and the like of the connecting rod. The non-normalized steel composition includes carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, and the remainder of iron (Fe), and inevitable impurities, based on a total weight of the composition.

8 Claims, 3 Drawing Sheets

(51) Int. Cl.
*C21D 7/13* (2006.01)
*C21D 1/63* (2006.01)
*C21D 9/00* (2006.01)
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/50* (2006.01)
*F16C 7/00* (2006.01)
*C21D 7/06* (2006.01)
*C21D 7/10* (2006.01)
*C21D 1/30* (2006.01)
*C21D 1/607* (2006.01)
*C21D 8/00* (2006.01)

(52) U.S. Cl.
CPC ........ *C21D 8/005* (2013.01); *C21D 2211/002* (2013.01); *C21D 2211/005* (2013.01); *C21D 2211/009* (2013.01); *C21D 2221/00* (2013.01)

(56) References Cited

FOREIGN PATENT DOCUMENTS

| | | | |
|---|---|---|---|
| JP | 5151662 B2 | | 2/2013 |
| JP | 2013032565 A | * | 2/2013 |
| KR | 10-2014-0000409 A | | 1/2014 |

* cited by examiner

NON-NORMALIZED STEEL COMPOSITION AND CONNECTING ROD USING THE SAME, AND METHOD OF MANUFACTURING THE CONNECTING ROD

CROSS-REFERENCE TO RELATED APPLICATIONS

This application claims priority under 35 U.S.C. § 119 to Korean Patent Application No. 10-2014-17862, filed on Feb. 17, 2014, in the Korean Intellectual Property Office, the disclosure of which is incorporated herein by reference in its entirety.

TECHNICAL FIELD

The present invention relates to a non-normalized steel composition, a connecting rod using the non-normalized steel composition, and a method of manufacturing the connecting rod. In particular, the non-normalized steel composition for manufacturing the connecting rod may include: carbon (C), silicon (Si), manganese (Mn), sulfur (S), vanadium (V), titanium (Ti), nitrogen (N), and iron (Fe). In addition, the method of manufacturing the connecting rod including a heat treatment technology for improving yield strength, fatigue strength, and the like of the connecting rod.

BACKGROUND

In general, a connecting rod for an engine of a vehicle is a main driving component of an engine system, which is connected to a piston to reciprocate inside a cylinder, and converts a linear reciprocating movement of the piston generated while receiving high-temperature and high-pressure gas pressure at an expansion stroke of the engine into a rotary movement of a crank shaft.

Particularly, the connecting rod serves to connect the piston and the crank shaft, convert the linear movement of the piston into the rotary movement of the crank shaft, and transmit power applied to the piston to the crank shaft so that a rotational torque is generated in the crank shaft.

The connecting rod may generally include three parts, a small end coupled with a piston pin, a big end coupled with the crank shaft, and a shank part for integrally connecting the small end and the big end. Since the connecting rod continuously receives a load, such as compression force, tensile force and bending, sufficient strength and stiffness of the connecting rod may be required.

Recently, in accordance with needs for high fuel efficiency and environmental regulations such as discharged gas, an engine of a vehicle using a gasoline direct injection (GDI) or a turbo gasoline direct injection (TGDI) method, in which the fuel is directly injected into a cylinder, has been developed. Such an engine generates higher combustion pressure than that of an engine in the related art, and the connecting rod receiving the pressure of the piston by the high combustion pressure may receive a higher load, such as higher compression force, tensile force, and bending.

In the related arts, a method of manufacturing the connecting rod includes a hot forging method, a sintering method, a casting method, and the like. The hot forging method is a processing method of heating a material at a re-crystallization temperature or greater and applying a pressing-down load to a metal material with a mold and a forging machine to mold the connecting rod. The sintering method is a method of cooling, compressing, and molding metal powder in a shape of a manufactured connecting rod and subsequently sintering the molded metal powder in a heating furnace to manufacture the connecting rod. The casting method is a method of injecting molten metal into a mold having an internal space corresponding to a shape of a manufactured connecting rod and coagulating the molten metal to manufacture the connecting rod. Since the connecting rod manufactured by casting method has a substantially low mechanical property such as mechanical strength compared to those manufactured by the hot forging method and the sintering method, the casting method has been barely used Thus, the connecting rod has been manufactured by the general hot forging method or sintering method, particularly by the hot forging method.

However, the hot forging method in the related art has a limitation in securing yield strength and fatigue strength with high performance, so that development of a new technology of manufacturing the connecting rod has been desired.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a novel non-normalized steel composition which may improve yield strength, fatigue strength, and the like of a connecting rod, when the connecting rod is manufactured by using the composition.

In an exemplary embodiment, the non-normalized steel composition may include: carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, and the remainder of iron (Fe), and inevitable impurities, with all said amounts based on a total weight of the composition. In certain exemplary embodiments, the non-normalized steel composition may further include chromium (Cr) in an amount of about 0.2 weight % or less, based on a total weight of the composition. In yet certain exemplary embodiments, the non-normalized steel composition may further include: phosphorus (P) in an amount of about 0.03 weight %, copper (Cu) in an amount of about 0.21 weight %, nickel (Ni) in an amount of about 0.07 weight %, molybdenum (Mo) in an amount of about 0.008 weight %, and aluminum (Al) in an amount of about 0.008 weight %, based on a total weight of the steel composition.

It is understood that weight % of the composition as disclosed herein are based on total weight of the non-normalized steel composition, unless otherwise indicated.

The present invention also provides the above non-normalized steel composition that consists essentially of, or consists of, the disclosed elements. For example, the is provided that the non-normalized steel composition consists of or consists essentially of: carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, and the remainder of iron (Fe), and inevitable impurities, based on a total weight of the steel composition.

Furthermore, the non-normalized steel composition consists of or consists essentially of: carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, chromium (Cr) in an amount of about 0.2 weight % or less; and the remainder of iron (Fe), and inevitable impurities, based on a total weight of the steel composition.

In addition, the non-normalized steel composition may suitably consist of or consist essentially of: carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, chromium (Cr) in an amount of about 0.2 weight % or less, phosphorus (P) in an amount of about 0.03 weight %, copper (Cu) in an amount of about 0.21 weight %, nickel (Ni) in an amount of about 0.07 weight %, molybdenum (Mo) in an amount of about 0.008 weight %, aluminum (Al) in an amount of about 0.008 weight %; and the remainder of iron (Fe), and inevitable impurities, based on a total weight of the steel composition.

In other aspect, provided is a connecting rod. In an exemplary embodiment, the connecting rod may be manufactured by using the non-normalized steel composition and include: a shank part including a bainite structure; a large end including a mixed structure of ferrite and pearlite; and a small end including a mixed structure of ferrite and pearlite.

In another aspect, the present invention provides a method of manufacturing a connecting rod.

In an exemplary embodiment, the method of manufacturing the connecting rod may include steps of: a first step of heating the non-normalized steel composition to a temperature of about 1,200° C. to about 1,300° C.; a second step of manufacturing the heated composition into a forged product by hot forging including buster, blocker, finisher, trimming, and piercing processes at a temperature of about 1,000° C. to 1,200° C.; a third step of controlled cooling the manufactured forged product by using a salt bath; a fourth step of short blasting the controlled cooled forged product; a fifth step of cold coining the short blasted forged product; a sixth step of stress relief annealing the cold coined forged product; and a seventh step of short blasting the annealed forged product to manufacture the connecting rod.

In certain exemplary embodiments, the salt bath in the third step may be an alkali-nitrate bath, a nitrate bath, a potassium hydroxide (KOH) bath, a sodium hydroxide (NaOH) bath, a barium chloride (BaCl$_2$) bath, a sodium chloride (NaCl) bath, or a lead (Pb) bath.

In certain exemplary embodiments, a cooling temperature of the controlled cooling in the third step may be in a range from about 150° C. to about 600° C.

In certain exemplary embodiments, a cooling speed of the controlled cooling in the third step may be in a range from about 5° C./sec to about 20° C./sec.

In certain exemplary embodiments, the stress relief annealing in the sixth step may be performed at a temperature of about 550° C. to 650° C. for about 60 minutes or greater.

As described above, according to various exemplary embodiments of the present invention, when the connecting rod is manufactured by using the non-normalized steel composition, a bainite structure may be included in the shank part, to which a load of the connecting rod is concentrated, and a mixed structure of ferrite and pearlite may be formed in the large end and the small end where require machinability, to thereby improve yield strength, fatigue strength, and the like.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

DETAILED DESCRIPTION OF THE EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner.

Hereinafter, the present invention will be described in detail with reference to the Tables, accompanying drawings, and the like.

The present invention relates to a non-normalized steel composition which may have an improved material property, such as fatigue strength and for which performance of a thermal treatment may be omitted. Also disclosed is a connecting rod using the non-normalized steel composition and a method of manufacturing the connecting rod.

In one aspect, the present invention provides to a non-normalized steel composition with an improved material property. Accordingly, a material property of the non-normalized steel composition may be improved by a precipitation strengthening effect by vanadium carbonitride (VCN), a grain refinement effect by titanium carbonitride (TiCN), and the like generated by combined addition of vanadium (V) and titanium (Ti), and adjustment of a content of nitrogen (N).

In an exemplary embodiment, the non-normalized steel composition may include: carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, and the remainder of iron (Fe), and inevitable impurities, based on a total weight of the composition. The non-normalized steel composition may selectively further include chromium (Cr) in an amount of about 0.2 weight % or less. Further, non-normalized steel composition may further include phosphorus (P) in an amount of about 0.03 weight %, copper (Cu) in an amount of about 0.21 weight %, nickel (Ni) in an amount of about 0.07 weight %, molybdenum (Mo) in an amount of about 0.008 weight %, aluminum (Al) in an amount of about 0.008 weight %, and the like based on the total weight of the composition.

As used herein, the carbon (C) may impart a large influence on improvement of strength, stiffness, and the like of the composition. In certain exemplary embodiments, a content of carbon (C) may be included in an amount of about 0.30 to 0.55 weight % based on the total weight of the composition. When the content of carbon (C) is less than about 0.30 weight %, strength, stiffness, and the like of the composition may not be obtained sufficiently. When the content of carbon (C) is greater than about 0.55 weight %, strength and the like of the composition may be improved, but an elongation rate of the composition may sharply decrease, thereby deteriorating cold workability.

The silicon (Si), as used herein, may enhance a ferrite matrix structure of the composition which may be formed at a large end of the connecting rod when the connecting rod is manufactured by hot forging and be easily split into fractures. The silicon (Si) may be included in an amount of about 0.80 to 1.20 weight % based on the total weight of the composition. When the content of silicon (Si) is less than about 0.80 weight %, the ferrite matrix structure enhancement effect may deteriorate. When the content of silicon (Si) is greater than about 1.20 weight %, brittleness of the composition may be caused.

The manganese (Mn), as used herein, may be a deacidification agent or a desulfurization agent of the composition, and may be combined with sulfur (S) included in the composition to form MnS, which is a non-metallic inclusion, thereby improving flexibility of the composition. Furthermore, the manganese (Mn) may improve strength of the composition by making pearlite be fine and solid solution which may harden the ferrite. The content of manganese (Mn) may be included in an amount of about 0.80 to 1.20 weight % based on the total weight of the composition. When the content of manganese (Mn) is less than about 0.80 weight %, strength of the composition may not be improved sufficiently. When the content of manganese (Mn) is greater than about 1.20 weight %, acid resistance, oxidation resistance, and the like of the composition may deteriorate.

The sulfur (S), as used herein, may be combined with manganese (Mn) among steels to form MnS inclusion, thereby serving to improve processability, machinability of the composition, and the like. The content of sulfur (S) may be included in an amount of about about 0.06 to 0.10 weight % based on the total weight of the composition. When the content of sulfur (S) is less than about 0.06 weight %, sufficient processability, machinability, and the like may not be obtained. When the content of sulfur (S) is greater than about 1.10 weight %, the sulfur (S) may react with iron (Fe) to form FeS which has a low melting point, thereby inducing a crack of the composition during hot forging or cold working.

The vanadium (V), as used herein, may improve strength and the like of the composition by precipitating a fine carbonitride. The content of vanadium (V) may be included in an amount of about 0.20 to 0.35 weight % based on the total weight of the composition. When the content of vanadium (V) is less than 0.20 weight %, the improvement of strength and the like of the composition may not be sufficiently obtained. When the content of vanadium (V) is greater than about 0.35 weight %, brittleness of the composition may increase and performance thereof may be not improved, thereby degrading economic efficiency.

The titanium (Ti), as used herein, may generate a carbonitride to improve yield strength, fatigue strength, and the like by grain refinement. The content of titanium (Ti) may be included in an amount of about 0.01 to 0.20 weight % based on the total weight of the composition. When the content of titanium (Ti) is less than about 0.01 weight %, sufficient yield strength, fatigue strength, and the like may not be obtained. When the content of titanium (Ti) is greater than about 0.20 weight %, brittleness and the like of the composition may increase.

The nitrogen (N), as used herein, may be an element imparting a large influence on a mechanical property of the composition, even though the substantially small amount of nitrogen (N) is included. Accordingly, the nitrogen (N) may improve tensile strength, yield strength, and the like of the composition. The content of nitrogen (N) may be included in an amount of about 0.005 to 0.02 weight % based on the total weight of the composition. When the content of nitrogen (N) is less than about 0.005 weight %, improvement of the tensile strength and yield strength of the composition may not be sufficiently obtained. When the content of nitrogen (N) is greater than about 0.02 weight %, an elongation rate and the like of the composition may decrease and brittleness of the composition may increase.

The chromium (Cr), as used herein, may improve strength, a quenching property, and the like of the composition. The content of chromium (Cr) may be included in an amount of about 0.02 weight % or less based on the total weight of the composition. When the content of chromium (Cr) is greater than about 0.02 weight %, economic efficiency may not be obtained since the effect thereof does not increase.

In other aspect, the non-normalized steel composition with an improved material property according to various exemplary embodiment of the present invention may be applied to a vehicle part and the like which demand improved fatigue strength and the like. In an exemplary embodiment, the connecting rod and the like for the vehicle may be manufactured by using the non-normalized steel composition.

In an exemplary embodiment, the present invention provides to a connecting rod using the non-normalized steel composition with an improved material property. In certain exemplary embodiments, the composition used for the connecting rod may include: carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount of about 0.01 to 0.20 weight %, nitrogen (N) in an amount of about 0.005 to 0.02 weight %, and the remainder of iron (Fe), and inevitable impurities, based on a total weight of the connecting rod.

Figure 1:
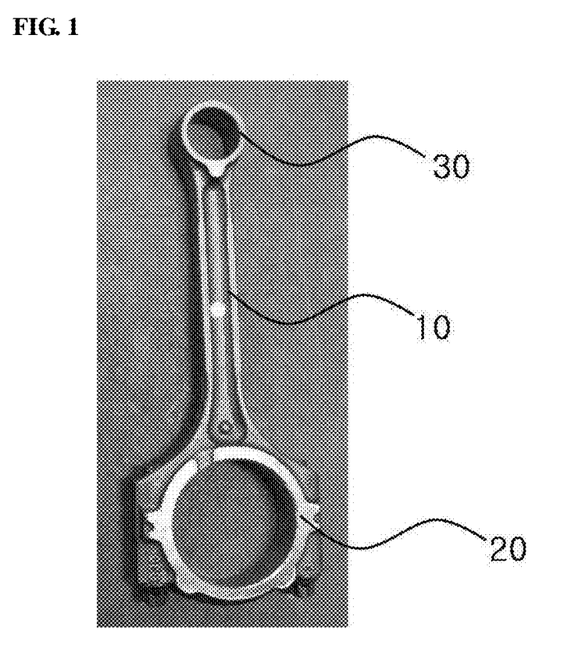
FIG. 1 is a photographic view illustrating an exemplary connecting rod in the art.

FIG. 1 is a photographic view showing an exemplary connecting rod. As illustrated in FIG. 1, in an exemplary embodiment, the connecting rod may include a shank part 10, a large end 20, and a small end 30. Particularly, the shank part 10 may include a bainite structure, and the large end 20 and the small end 30 may include a mixed structure of ferrite and pearlite.

Figure 2:
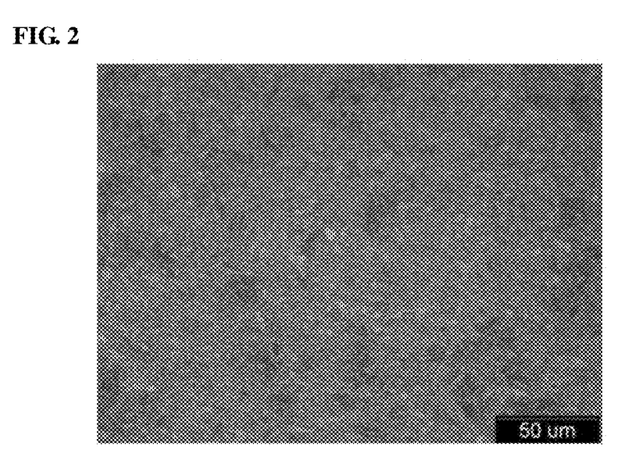
FIG. 2 shows an electron-microscopic view of an exemplary bainite structure of a shank part of the connecting rod according to an exemplary embodiment of the present invention.
Figure 3:
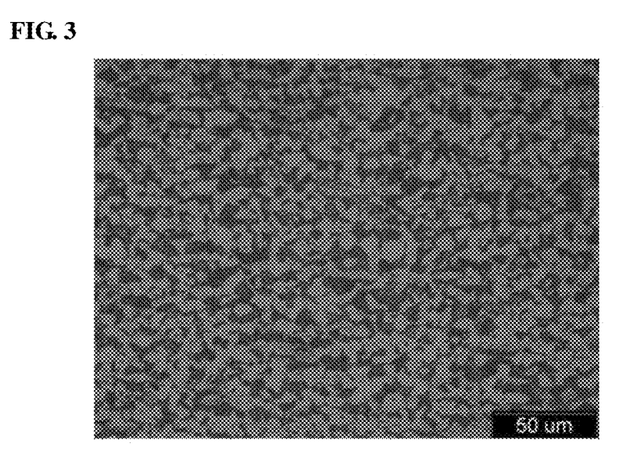
FIG. 3 shows an electron-microscopic view of an exemplary mixed structure of ferrite and pearlite of a big end and a small end of the connecting rod according to an exemplary embodiment of the present invention.

FIG. 2 shows an electron-microscopic view of an exemplary bainite structure of the shank part of the connecting rod according to an exemplary embodiment of the present invention, and FIG. 3 shows an electron-microscopic view of an exemplary mixed structure of ferrite and pearlite of the big end and the small end of the connecting rod according to an exemplary embodiment of the present invention.

Accordingly, the large end 20 and the small end 30 including the mixed structure of ferrite and pearlite may have improved machinability and the like, thereby having excellent processability. The shank part 10 including the bainite structure, to which a mechanical load is mainly applied, may have improved fatigue strength, yield strength, and the like.

In another aspect, the present invention provides to a method of manufacturing the connecting rod by using the non-normalized steel composition with an improved material property. Particularly, in the method of manufacturing the connecting rod, the connecting rod may be manufactured by, but not limited to, forging, or hot forging.

In an exemplary embodiment, the method of manufacturing the connecting rod may include steps of: a first step of heating a non-normalized steel composition to a temperature of about 1,200° C. to 1,300° C.; a second step of manufacturing the heated composition into a forged product by hot forging including buster, blocker, finisher, trimming, and piercing processes at a temperature of about 1,000° C. to 1,200° C.; a third step of controlled cooling the manufactured forged product by using a salt bath; a fourth step of short blasting the controlled cooled forged product; a fifth step of cold coining the short blasted forged product; a sixth step of stress relief annealing the cold coined forged product; and a seventh step of short blasting the annealed forged product to manufacture the connecting rod.

Figure 4:
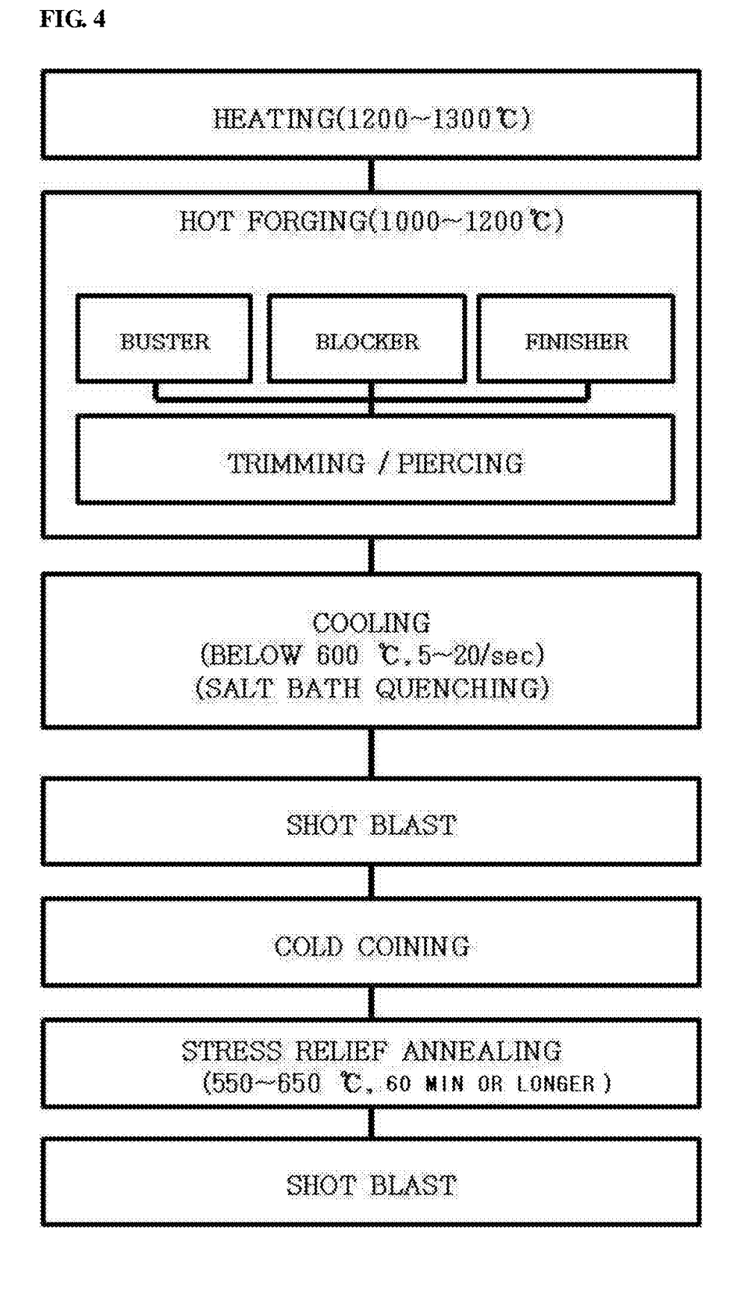
FIG. 4 is an exemplary process chart illustrating an exemplary method of manufacturing the connecting rod according to an exemplary embodiment of the present invention.

FIG. 4 is an exemplary process chart illustrating an exemplary method of manufacturing the connecting rod according to an exemplary embodiment of the present invention. As illustrated in the process chart, the composition according to the present invention may be heated to a temperature of about 1,200° C. to 1,300° C. In certain exemplary embodiments, a buster, a blocker, a finisher, and the like may be performed on the heated composition at a temperature of about 1,000° C. to 1,200° C. Subsequently, a hot forging process, such as trimming and piercing, may be performed, and then heat treatment through a cooling control may be performed.

In certain exemplary embodiments, the heat treatment may include quenching with a salt bath in order to perform a rapid cooling thermal process and form a bainite structure by maintaining a constant temperature state. The bainite structure, as used herein, refers to a structure formed when isothermal transformation is generated by quenching carbon steel or alloy steel by using a salt bath.

In yet certain exemplary embodiment, the salt bath may be, but not limited to, an alkali-nitrate bath, a nitrate bath, a potassium hydroxide (KOH) bath, a sodium hydroxide (NaOH) bath, a barium chloride ($BaCl_2$) bath, a sodium chloride (NaCl) bath, or lead (Pb) bath depending on the types of salts used therein.

In certain exemplary embodiments, a cooling temperature of the controlled cooling using the salt bath may be about 600° C. or less, or particularly in a range from about 150° C. to about 600° C. in order to effectively form the bainite structure. Further, a cooling speed of the controlled cooling may be in a range of from 5° C./sec to 20° C./sec in order to effectively form the bainite structure.

In certain exemplary embodiments, in performing the controlled cooling by using the salt bath in the third step, a part configuring the shank part 10 of the connecting rod may have a less thickness than that of the other parts, so that the cooling speed may substantially increase thereby improving the formation of the bainite structure. In yet certain embodiments, the large end 20 and the small end 30 of the connecting rod may have a greater thicknesses than the shank part 10, the cooling speed may decrease, thereby improving the formation of a mixed structure of ferrite and pearlite.

In certain exemplary embodiments, the short blast process may be performed in order to polish a surface of the heat treated forged product. The forged product treated the short blast process may be subjected to the cold coining process in order to improve and correct surface roughness. Subsequently, the forged product treated with the cold coining process, may be subjected to the stress relief annealing process at a temperature of about 550° C. to 650° C. for about 60 minutes or longer in order to relieve residual stress inside the forged product. The surface of the forged product treated with the annealing process may be polished by the repeated short blast process, to thereby manufacture the connecting rod.

EXAMPLE

Hereinafter, the present invention will be described in more detail through Examples. These Examples are only for illustrating the present invention, and it will be obvious to those skilled in the art that the scope of the present invention is not interpreted to be limited by these Examples.

Improvements in physical properties of the connecting rod, which is the forged product manufactured by using the non-normalized steel composition according to the present invention, were confirmed by comparing a material property of the connecting rod of the Example according to exemplary embodiment of the present invention with that of the Comparative Examples in the related art.

TABLE 1

| Classification | Unit | Example 1 | Comparative Example 1 |
|---|---|---|---|
| C | weight % | 0.36 | 0.36 |
| Si | weight % | 1.01 | 0.6 |
| Mn | weight % | 1.0 | 1.0 |
| P | weight % | 0.03 | 0.03 |
| S | weight % | 0.07 | 0.07 |
| Cu | weight % | 0.21 | 0.21 |
| Ni | weight % | 0.07 | 0.07 |
| Cr | weight % | 0.15 | 0.23 |
| Mo | weight % | 0.008 | 0.008 |
| Al | weight % | 0.008 | 0.008 |
| V | weight % | 0.30 | 0.30 |
| Ti | weight % | 0.04 | — |
| N | weight % | 0.0111 | — |
| Fe | weight % | remainder | remainder |

In Table 1, the compositions of the Example 1 according an exemplary embodiment of the present invention and the Comparative Example 1 as manufactured in the related art are compared.

TABLE 2

| Classification | Unit | Example 1 | Comparative Example 1 |
|---|---|---|---|
| Yield strength | MPa | 857 | 754 |
| Tensile strength | MPa | 1100 | 984 |
| Elongation rate | % | 15.0 | 12.1 |
| Bending fatigue strength | MPa | 549 | 471 |
| Impact value | J/cm$^2$ | 9.7 | 44.6 |

In Table 2, the physical properties such as yield strength, tensile strength, an elongation rate, bending fatigue strength, and an impact value of the connecting rods manufactured without a heat treatment process in the Example 1 and the Comparative Example 1 from Table 1 are shown.

As shown in Table 2, compared to the Comparative Example 1, yield strength is improved by about 14%, tensile strength is improved by about 12%, an elongation rate is improved by 24%, and bending fatigue strength is improved by about 17%. However, the impact value is decreased by about 78% in the Example 1 indicating that the connecting rod of the Example 1 has considerably large brittleness compared to the Comparative Example 1 and the connecting rod of the Example 1 may be weak to impact.

TABLE 3

| Classification | Unit | Example 1 | Comparative Example 2 | Comparative Example 3 | Comparative Example 4 | Comparative Example 5 |
|---|---|---|---|---|---|---|
| C | weight % | 0.36 | 0.36 | 0.70 | 0.36 | 0.36 |
| Si | weight % | 1.01 | 1.01 | 1.01 | 1.01 | 1.01 |
| Mn | weight % | 1.0 | 1.0 | 1.0 | 1.0 | 1.0 |
| P | weight % | 0.03 | 0.03 | 0.03 | 0.03 | 0.03 |
| S | weight % | 0.07 | 0.07 | 0.07 | 0.07 | 0.07 |
| Cu | weight % | 0.21 | 0.21 | 0.21 | 0.21 | 0.21 |
| Ni | weight % | 0.07 | 0.07 | 0.07 | 0.07 | 0.07 |
| Cr | weight % | 0.15 | 0.15 | 0.15 | 0.15 | 0.15 |
| Mo | weight % | 0.008 | 0.008 | 0.008 | 0.008 | 0.008 |
| Al | weight % | 0.008 | 0.008 | 0.008 | 0.008 | 0.008 |
| V | weight % | 0.30 | 0.40 | 0.10 | 0.30 | 0.30 |
| Ti | weight % | 0.04 | 0.04 | 0.04 | 0.30 | 0.04 |
| N | weight % | 0.0111 | 0.02 | 0.011 | 0.02 | 0.0025 |
| Fe | weight % | remainder | remainder | remainder | remainder | remainder |

In Table 3, the compositions of the Example 1 according to an exemplary embodiment of the present invention and the Comparative Examples 2 to 5 are compared.

As shown in Table 3, the content of vanadium (V) is not within the scope of content of the present invention in the Comparative Example 2, the content of carbon (C) is not within the scope of content of the present invention in the Comparative Example 3, the content of titanium (Ti) is not within the scope of content of the present invention in the Comparative Example 4, and the content of nitrogen (N) is not within the scope of content of the present invention in the Comparative Example 5.

TABLE 4

| Classification | Unit | Example 1 | Comparative Example 2 | Comparative Example 3 | Comparative Example 4 | Comparative Example 5 |
|---|---|---|---|---|---|---|
| Yield strength | MPa | 857 | 872 | 730 | 894 | 782 |
| Tensile strength | MPa | 110 | 1131 | 1023 | 1098 | 987 |
| Elongation rate | % | 15.0 | 11.8 | 10.9 | 11.3 | 17.1 |
| Bending fatigue strength | MPa | 549 | 562 | 389 | 532 | 428 |
| Impact value | (J/cm$^2$) | 9.7 | 5.4 | 14.0 | 4.8 | 21.2 |

In Table 4, the physical properties such as yield strength, tensile strength, elongation rate, bending fatigue strength, and an impact value in the Example 1 and the Comparative Examples 2 to 5 from Table 3 are compared. In the Comparative Example 2 the yield strength, tensile strength, and bending fatigue strength are improved, but the impact value is reduced, so that brittleness increases, compared to the Example 1. In the Comparative Example 3, the impact value increases, so that brittleness decreases, but a general material property is weak. In the Comparative Example 4, the yield strength is improved, but the impact value is reduced, so that brittleness increases and thus the connecting rod may be easily broken. In the Comparative Example 5, the elongation rate and the impact value are improved, but the yield strength, tensile strength, and bending fatigue strength are reduced.

TABLE 5

| | Classification | Unit | Example 2 | Comparative Example 6 | Comparative Example 7 | Comparative Example 8 | Comparative Example 9 |
|---|---|---|---|---|---|---|---|
| Forging method | Cooling method | — | Salt bath | Air cooling | Fan cooling | Fan cooling | Fan cooling |
| | Cooling speed | °C./sec | 12.5 | 2.1 | 6.3 | 8.8 | 7.9 |
| Structure configuration | Large end and small end | — | Ferrite and pearlite | Ferrite and pearlite | Ferrite and pearlite | Ferrite and pearlite | Ferrite and pearlite |
| | Shank part | — | Bainite | Ferrite and pearlite | Ferrite and pearlite | Ferrite and pearlite | Ferrite and pearlite |
| Property | Yield strength | MPa | 1033 | 807 | 849 | 883 | 762 |
| | Bending fatigue strength | MPa | 575 | 559 | 561 | 565 | 471 |
| | Impact value | J/cm$^2$ | 31.3 | 9.5 | 9.6 | 8.7 | 42.4 |

In Table 5, the structure configuration and the material property changed according to the cooling method in the heat treatment for the Example 1 having the composition from Table 1 are shown. The fan cooling among the cooling methods in Table 5, which is cooling by using a cooling fan, has a cooling speed greater than that by air cooling, but is lower than that by a salt bath.

The connecting rod of the Example 2 includes the composition of the Example 1 of Table 1 and is manufactured by the manufacturing method according to exemplary embodiments of the present invention, and the structure configuration and the material property changed according to the cooling method and the cooling speed are compared with the Comparative Examples 6 to 8. Further, the structure configuration and the material property of the Example 2 are compared with those of produced conventional product of the Comparative Example 9, which includes the composition of the Comparative Example 1 from Table 1 and is manufactured by the fan cooling.

Since the Example 2 has the composition according to an exemplary embodiment of the present invention and is manufactured by the cooling method using the salt bath during the heat treatment in the forging process, the large end and the small end of the connecting rod manufactured in the Example 2 include the mixed structure of ferrite and pearlite similar to the related art. The shank part in the Example 2 includes the bainite structure unlike the related art, so that the yield strength and the bending fatigue strength thereof have the greatest values among the Comparative Examples 6 to 9, and the impact value has a value which is not small.

As described above, the present invention has been described in relation to exemplary embodiments of the present invention, but the exemplary embodiments are only illustration and the present invention is not limited thereto. Exemplary embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A connecting rod, which is manufactured by using a non-normalized steel composition comprising:
    carbon (C) in an amount of about 0.30 to 0.55 weight %,
    silicon (Si) in an amount of about 0.80 to 1.20 weight %,
    manganese (Mn) in an amount of about 0.80 to 1.20 weight %,
    sulfur (S) in an amount of about 0.06 to 0.10 weight %,
    vanadium (V) in an amount of about 0.20 to 0.35 weight %,
    titanium (Ti) in an amount greater than 0.01 weight % and less than or of about 0.20 weight %,
    nitrogen (N) in an amount of about 0.005 to 0.02 weight %, and
    the remainder of iron (Fe), and inevitable impurities,
    based on a total weight of the steel composition,
    wherein the connecting rod comprises:
    a shank part including a bainite structure;
    a large end including a mixed structure of ferrite and pearlite; and
    a small end including a mixed structure of ferrite and pearlite, and
    wherein the large end and the small end have a greater thickness than the shank part; and
    the connecting rod has a yield strength of 857 MPa or greater.

2. The connecting rod of claim 1, wherein the non-normalized steel composition further comprises:
    chromium (Cr) in an amount of about 0.2 weight % or less, based on a total weight of the steel composition.

3. The connecting rod of claim 1, wherein the non-normalized steel composition further comprises:
    phosphorus (P) in an amount of about 0.03 weight %, copper (Cu) in an amount of about 0.21 weight %, nickel (Ni) in an amount of about 0.07 weight %, molybdenum (Mo) in an amount of about 0.008 weight %, and aluminum (Al) in an amount of about 0.008 weight %, based on a total weight of the steel composition.

4. The connecting rod of claim 1, wherein the non-normalized steel composition consists essentially of:
carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount greater than 0.01 weight % and less than or of about 0.20 weight %, nitrogen (N) in an amount of about 0.005 to 0.02 weight %, and the remainder of iron (Fe), and inevitable impurities, based on a total weight of the steel composition.

5. The connecting rod of claim 1, wherein the non-normalized steel composition consists essentially of:
carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount greater than 0.01 weight % and less than or of about 0.20 weight %, nitrogen (N) in an amount of about 0.005 to 0.02 weight %, chromium (Cr) in an amount of about 0.2 weight % or less, and the remainder of iron (Fe), and inevitable impurities, based on a total weight of the steel composition.

6. The connecting rod of claim 1, wherein the non-normalized steel composition consists essentially of:
carbon (C) in an amount of about 0.30 to 0.55 weight %, silicon (Si) in an amount of about 0.80 to 1.20 weight %, manganese (Mn) in an amount of about 0.80 to 1.20 weight %, sulfur (S) in an amount of about 0.06 to 0.10 weight %, vanadium (V) in an amount of about 0.20 to 0.35 weight %, titanium (Ti) in an amount greater than 0.01 weight % and less than or of about 0.20 weight %, nitrogen (N) in an amount of about 0.005 to 0.02 weight %, chromium (Cr) in an amount of about 0.2 weight % or less, phosphorus (P) in an amount of about 0.03 weight %, copper (Cu) in an amount of about 0.21 weight %, nickel (Ni) in an amount of about 0.07 weight %, molybdenum (Mo) in an amount of about 0.008 weight %, aluminum (Al) in an amount of about 0.008 weight %; and the remainder of iron (Fe), and inevitable impurities, based on a total weight of the steel composition.

7. The connecting rod of claim 1, wherein the connecting rod has a yield strength of greater than 1000 MPa.

8. The connecting rod of claim 1, wherein the titanium (Ti) is present in an amount of 0.04 weight % or greater and less than or of about 0.20 weight %, based on a total weight of the steel composition.

* * * * *